US012134672B2

(12) United States Patent
Wu et al.

(10) Patent No.: US 12,134,672 B2
(45) Date of Patent: Nov. 5, 2024

(54) BACTERIA REPELLANT POLYMER COMPOSITES

(71) Applicant: Ka Shui Plastic Technology Co. Ltd., Hong Kong (CN)

(72) Inventors: You Wu, Hong Kong (CN); Ho-Man Au, Hong Kong (CN); Yan-Hua Zhao, Hong Kong (CN); Hoi-Kuan Kong, Hong Kong (CN); Xi-Zi Song, Hong Kong (CN); Wai-Chung Peter Wong, Hong Kong (CN); Cheuk Nang Daniel Sung, Hong Kong (CN); Yuen-Fat Lee, Hong Kong (CN)

(73) Assignee: Ka Shui Plastic Technology Co. Ltd., Hong Kong (CN)

( * ) Notice: Subject to any disclaimer, the term of this patent is extended or adjusted under 35 U.S.C. 154(b) by 777 days.

(21) Appl. No.: 17/248,687

(22) Filed: Feb. 3, 2021

(65) Prior Publication Data

US 2022/0242989 A1  Aug. 4, 2022

(51) Int. Cl.
*C08F 283/06* (2006.01)
*C08J 3/22* (2006.01)
*C08K 3/36* (2006.01)
*C08L 83/12* (2006.01)

(52) U.S. Cl.
CPC ............. *C08F 283/06* (2013.01); *C08J 3/226* (2013.01); *C08K 3/36* (2013.01); *C08L 83/12* (2013.01); *C08J 2383/04* (2013.01); *C08J 2383/12* (2013.01); *C08J 2483/04* (2013.01); *C08J 2483/12* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 5,409,978 A * | 4/1995 | Hamada | B29B 7/007 523/213 |
| 6,096,564 A | 8/2000 | Denes et al. | |
| 8,927,616 B2 | 1/2015 | Thomas et al. | |
| 9,498,934 B2 | 11/2016 | Paxson et al. | |
| 9,683,197 B2 | 6/2017 | Aizenberg et al. | |
| 10,030,108 B1 | 7/2018 | Lau et al. | |
| 10,525,614 B2 | 1/2020 | Lau et al. | |
| 2018/0208753 A1 | 7/2018 | Lau et al. | |
| 2019/0263981 A1 | 8/2019 | Wu et al. | |

(Continued)

FOREIGN PATENT DOCUMENTS

| | | |
|---|---|---|
| CA | 2234538 A1 | 10/1998 |
| CA | 2235090 A1 | 10/1998 |
| CA | 2241380 A1 | 12/1998 |

(Continued)

OTHER PUBLICATIONS

Krstic et al, Liquid Nanocarriers for drug targeting. (Year: 2018).*

(Continued)

*Primary Examiner* — Satya B Sastri
(74) *Attorney, Agent, or Firm* — S&F/WEHRW (57) ABSTRACT

Provided herein is a masterbatch including a grafted silicone polyether and a porous inorganic nanoparticle, bacteria repellant polymer composites including the same, and methods of preparation thereof.

7 Claims, 1 Drawing Sheet

(56) References Cited

U.S. PATENT DOCUMENTS

2020/0017658 A1* 1/2020 Liu .................. C08L 83/04

FOREIGN PATENT DOCUMENTS

| CA | 2244049 A1 | 1/1999 |
| CN | 109843988 A | 6/2019 |
| DE | 19700082 A1 | 7/1998 |
| DE | 19818958 A1 | 11/1999 |
| WO | 2000/044818 A1 | 8/2000 |
| WO | 2012/058605 A1 | 5/2012 |
| WO | 2013/003373 A1 | 1/2013 |
| WO | 2015/009257 A1 | 1/2015 |

OTHER PUBLICATIONS

First Office Action of CN2021101472334 issued from the China National Intellectual Property Administration on Feb. 24, 2023.

\* cited by examiner

BACTERIA REPELLANT POLYMER COMPOSITES

TECHNICAL FIELD

The present disclosure relates to a method for the chemical modification of a polymer to improve the anti-biological adhesion of the polymer surface. More particularly, the present disclosure relates to a bacteria repellant polymer composite and methods of preparation and use thereof.

BACKGROUND

The development of polymers with antimicrobial functions is not only of great significance for basic research, but also of great significance in practical applications. Many active ingredients with antimicrobial properties have been reported. Typical antimicrobial agents used in polymer compositions include silver-based nanoparticles, quaternary ammonium salts, chitosan, and polyphenols. However, there is a growing focus on the safety of antimicrobial agents used in such polymer compositions. For example, it is reported that silver nanoparticles can enter the brain, and over time can cause neuronal degeneration and necrosis. Another report disclosed that nanosilver has the risk of mutating fish embryos. In addition, bacteria that are overexposed to antibiotics/antimicrobial agents can develop anti-bacterial resistance. Public health officials in Nevada reported a case of death from an incurable disease in Nevada, United States. Tests showed that the superbugs that spread over the patient's body were resistant to 26 different antibiotics.

There is thus a strong need to develop bacteria repellant polymer composites prepared using a safe, non-leaching, non-polluting method that can prevent bacteria from attaching rather than killing them. According to early basic research, the surface energy of the polymer substrate can play a vital role in the adhesion of bacteria to the surface of the polymer. When the initial surface tension of the substrate surface is 20-30 mN/m (i.e., low-energy surface), the long-term adhesion of microorganisms is the lowest. Silicone and fluoropolymer are two well-known anti-fouling organic compounds, which are used as the basic components of coatings due to their low surface energy properties. Due to their hydrophilicity and steric hindrance to various biological fluids (such as proteins, bacteria and viruses), polyethylene glycol coatings are also widely used as anti-fouling modifiers. Conventional anti-fouling modification of polymers is usually achieved by surface modification and coating of a hydrophilic layer on the polymer surface after compression molding.

There thus exists a need for improved bacteria repellant polymer composites and methods of preparation thereof that address or overcome at least some of the aforementioned challenges.

SUMMARY

Therefore, the present disclosure provides methods for preparing bacteria repellant polymer composites from commercially available silicone rubbers and which endows the silicone rubbers with anti-biological adhesion properties.

In a first aspect, provided herein is a masterbatch comprising a grafted silicone polyether and a porous inorganic nanoparticle.

In certain embodiments, the grafted silicone polyether comprises one or more polyethers selected from the group consisting of a fatty alcohol polyoxyalkylene ether, a polyoxyalkylene fatty acid, a polyoxyalkylene sorbitan, a polyoxyalkylene sorbitan fatty acid ester, a polyalkylene glycol, and combinations thereof grafted to a poly($C_1$-$C_6$) alkylsiloxane.

In certain embodiments, the grafted silicone polyether is a polymethylsiloxane grafted to one or more polyethers selected from the group consisting of a polyethylene glycol, a polypropylene glycol, or a copolymer thereof, wherein the one or more polyethers each has a number averaged molecular weight between 300-50,000 Da.

In certain embodiments, the porous inorganic nanoparticle is selected from the group consisting of silica, aluminum oxide, carbon black, zinc oxide, ferrous oxide, and mixtures thereof.

In certain embodiments, the porous inorganic nanoparticle has a specific surface area between 50-500 $m^2/g$.

In certain embodiments, the grafted silicone polyether is a polymethylsiloxane grafted to one or more polyethylene glycol and the porous inorganic nanoparticle is silica.

In a second aspect, provided herein is a bacteria repellant polymer composite comprising the masterbatch described herein and at least one base polymer.

In certain embodiments, the porous inorganic nanoparticle is present at a weight ratio of at least 5% wt/wt relative to the weight of the grafted silicone polyether, the at least one base polymer, and the porous inorganic nanoparticle.

In certain embodiments, the at least one base polymer is selected from the group consisting of thermoplastic polyurethane (TPU), styrene-ethylene-butylene-styrene (SEBS), polyolefin elastomers (POE), thermoplastic polyester elastomer (TPEE), thermoplastic vulcanizates (TPV), polyethene (PE), polypropylene (PP), polystyrene (PS), styrene acrylonitrile resin (SAN), acrylonitrile butadiene styrene (ABS), polycyclohexylenedimethylate terephthalate glycol (PCTG), polylactic acid (PLA), poly(methyl methacrylate) (PMMA), polyethylene terephthalate (PET), polycarbonate (PC), polymethylpentene (PMP), polyamide (PA), polyvinyl chloride (PVC), ethylene-vinyl acetate (EVA), methylmethacrylate butadiene styrene (MBS), a silicone rubber, and blends and copolymers thereof.

In certain embodiments, the at least one base polymer is a silicone rubber.

In certain embodiments, the at least one base polymer is selected from the group consisting of liquid silicone rubber (LSR) or heat curing rubber (HCR).

In certain embodiments, the masterbatch comprises a polymethylsiloxane grafted to one or more polyethylene glycol and silica.

In certain embodiments, the at least one base polymer is a silicone rubber.

In certain embodiments, the masterbatch comprises a polymethylsiloxane grafted to one or more polyethylene glycols and silica; and the at least one base polymer is selected from the group consisting of LSR and HCR, wherein the silica is present at a weight ratio of 0.5-2% relative to the weight of the relative to the weight of the grafted silicone polyether, the at least one base polymer, and the silica.

In a third aspect, provided herein is a method of preparing the bacteria repellant polymer composite described herein, the method comprising: combining the grafted silicone polyether and the porous inorganic nanoparticle thereby forming the masterbatch; combining the masterbatch with the at least one base polymer thereby forming an uncured polymer composite; and curing the uncured polymer composite thereby forming the bacteria repellant polymer composite.

In certain embodiments, the step of curing the uncured polymer composite comprises heating the uncured polymer composite at a temperature of 120° C.-220° C.; or combining a curing agent to the uncured polymer composite thereby forming and heating the uncured polymer composite at a temperature of 120° C.-220° C.

In certain embodiments, the porous inorganic nanoparticle is present at a weight ratio of at least 0.5% wt/wt relative to the weight of the grafted silicone polyether, the at least one base polymer, and the porous inorganic nanoparticle.

In certain embodiments, the grafted silicone polyether is a polymethylsiloxane grafted to one or more polyethylene glycol moieties; the porous inorganic nanoparticle is silica; the at least one base polymer is a silicone rubber.

In certain embodiments, the silica is present at a weight ratio of 0.5-1% wt/wt relative to the weight of the grafted silicone polyether, the at least one base polymer, and the porous inorganic nanoparticle.

In a fourth aspect, provided herein is a method of preparing the bacteria repellant polymer composite described herein, the method comprising: combining a functionalized polyether selected from a dialkyl hydrosilane terminated polyether, an allyl terminated polyether, and a vinyl terminated polyether; at least one silicone rubber base polymer; and a porous inorganic nanoparticle thereby forming an uncured polymer composite; and curing the uncured polymer composite resulting in the grafting of the functionalized polyether to at least a portion of the at least one silicone rubber base polymer and thereby forming the bacteria repellant polymer composite.

According to the method and composition provided by the present invention, the hardness, density, and mechanical properties of the modified silicone are well maintained, and at the same time they also meet various standards in different application fields. For example, since the main components added to the composition of the modifier according to the present invention can make the final product or the molded article formed therefrom have the ability to resist biological contamination and resist biological substances, such as microorganisms, mammalian cells, proteins, peptides, nucleic acids, steroids, and other cellular components, the final product or molded products formed therefrom meet the standards for food and beverage safe polymers.

BRIEF DESCRIPTION OF DRAWINGS

The appended drawings, where like reference numerals refer to identical or functionally similar elements, contain figures of certain embodiments to further illustrate and clarify the above and other aspects, advantages and features of the present disclosure. It will be appreciated that these drawings depict exemplary embodiments and as such are not intended to limit the scope of the present disclosure. The present disclosure will be described and explained with additional specificity and detail through the use of the accompanying drawings.

DETAILED DESCRIPTION

Definitions

Figure 1:
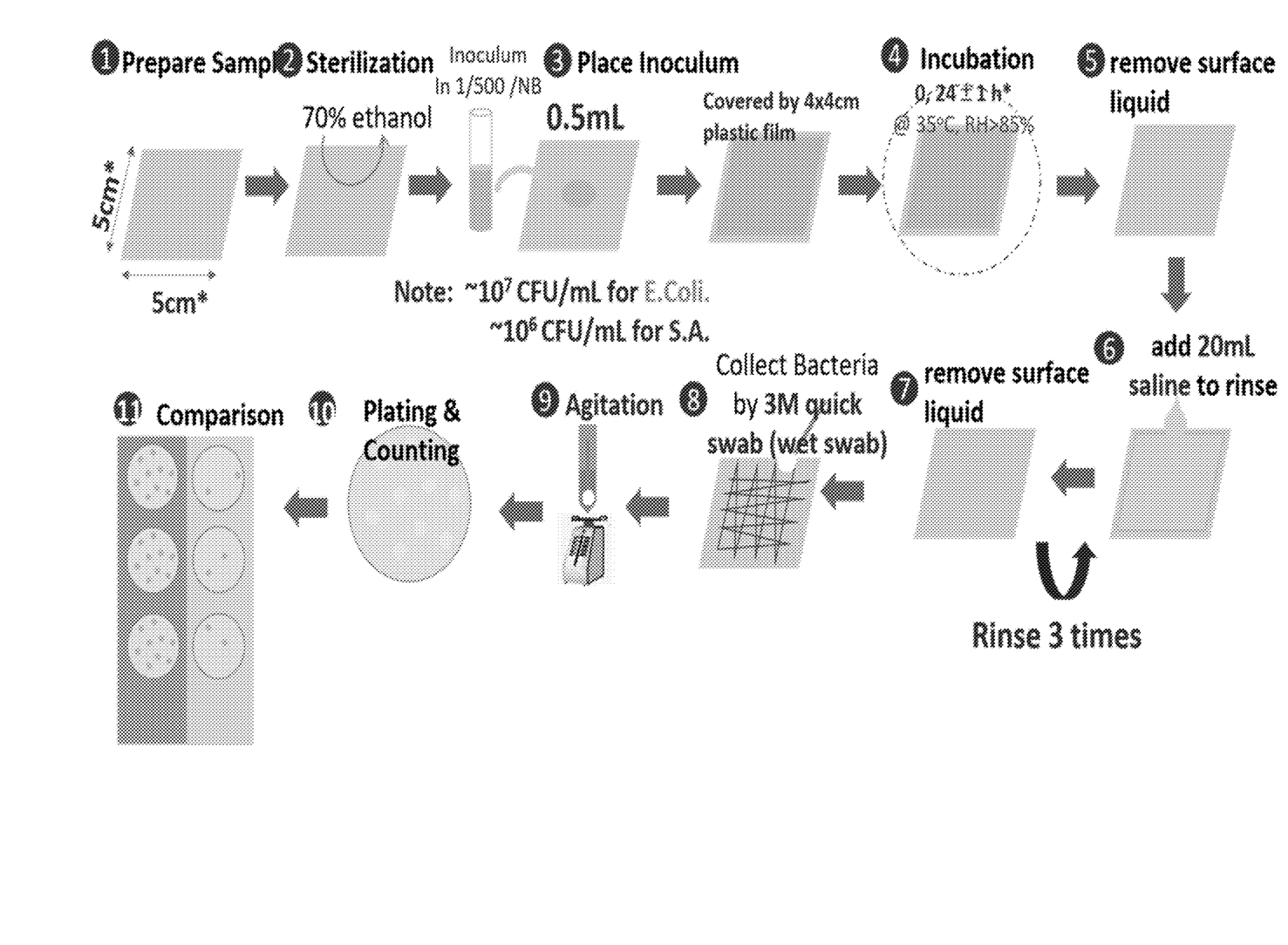
The FIGURE is a schematic diagram of the process of microbial adsorption test on samples. The process is based on the revised ASTM WK66122 standard.

References in the specification to "one embodiment", "an embodiment", "exemplary embodiment", etc. mean that the described embodiment may include a particular feature, structure, or characteristic, but not every embodiment may Including the specific feature, structure or characteristic. Moreover, such phrases do not necessarily refer to the same embodiment. In addition, when a specific feature, structure or characteristic is described in conjunction with a certain embodiment, no matter whether it is explicitly described or not, it is considered that the effect of applying the characteristic, structure or characteristic to other embodiments is within the scope of knowledge of those skilled in the art.

Values expressed in ranges should be interpreted in a flexible manner, including not only the values explicitly listed as the limits of the range, but also all individual values or subranges included in the range, as if each value and subrange were clearly stated. For example, a concentration range of "about 0.1% to about 5%" should be construed to include not only the explicitly listed about 0.1% to about 5% by weight, but also individual concentrations within the specified range (e.g., 1%, 2%), 3% and 4%) and sub-ranges (e.g. 0.1% to 0.5%, 1.1% to 2.2% and 3.3% to 4.4%).

As described herein, unless otherwise stated, the term "a" or "an" is used to include one or more than one, and the term "or" is used to refer to a non-exclusive "or." In addition, when the terms or terms used herein are not otherwise defined, they should be understood as being used only for the purpose of description and not for the purpose of limitation. In addition, all publications, patents, and patent documents mentioned in the specification are incorporated herein by reference in their entirety, as if individually incorporated by reference. If the usage between this document and those documents incorporated by reference is inconsistent, the usage in the cited reference shall be considered as a supplement to this document. For irreconcilable inconsistencies, the usage in this document shall prevail.

In the manufacturing method described in the specification, the steps can be performed in any order without departing from the principle of the present invention, except that the time or operation sequence is clearly stated. It is stated in the claims that a step is performed first, and then several other steps are performed. It should be considered that the first step is performed before any other steps, and other steps can be performed in any other steps, unless in other steps the sequence is further listed in the step. For example, a claim stating "step A, step B, step C, step D, and step E" should be interpreted to mean that step A is performed first, and step E is performed last, and steps B, C, and D can be performed in steps A and E They are executed in any order, and these orders still fall within the literal scope of the process claimed by the claims. Likewise, a given step or substep can be repeated.

In addition, unless the claims clearly state that they are executed separately, the specified steps can be executed simultaneously. For example, the required step of doing X and the required step of doing Y can be performed simultaneously in a single operation, and such a process will fall within the literal scope of the claimed process.

The singular forms "a", "an" and "the" may include plural indicators unless the context clearly dictates otherwise.

The term "about" may allow a range of values or a degree of variability within a range, for example, within 10% or 5% of a specified value or specified range of the range.

Unless the context clearly dictates otherwise, the term "independently selected from" means that the mentioned groups are the same, different, or a mixture thereof. Therefore, under this definition, "X1, X2, and X3 are independently selected from inert gases" will include the following schemes, for example, when X1, X2, and X3 are all the same, X1, X2, and X3 are completely different, where X1 and X2 are the same, But X3 is different, and other similar arrangements.

As used herein, "alkyl" refers to a straight-chain or branched saturated hydrocarbon group. Examples of alkyl groups include methyl-, ethyl-, propyl (e.g., n-propyl and isopropyl), butyl (e.g., n-butyl, iso-butyl, sec-butyl, tert-butyl), pentyl groups (e.g., 1-methylbutyl, 2-methylbutyl, iso-pentyl, tert-pentyl, 1,2-dimethylpropyl, neopentyl, and 1-ethylpropyl), hexyl groups, and the like. In various embodiments, an alkyl group can have 1 to 40 carbon atoms (i.e., C1-40 alkyl group), for example, 1-30 carbon atoms (i.e., C1-30 alkyl group). In certain embodiments, an alkyl group can have 1 to 6 carbon atoms, and can be referred to as a "lower alkyl group." Examples of lower alkyl groups include methyl, ethyl, propyl (e.g., n-propyl and isopropyl), and butyl groups (e.g., n-butyl, isobutyl, sec-butyl, tert-butyl). In certain embodiments, alkyl groups can be optionally substituted as described herein. An alkyl group is generally not substituted with another alkyl group, an alkenyl group, or an alkynyl group.

As used herein, a "polymeric compound" (or "polymer") refers to a molecule including a plurality of one or more repeating units connected by covalent chemical bonds. A polymeric compound can be represented by General Formula I:

$$\text{*-(-(Ma)}_x\text{-(Mb)}_y\text{-)}_z\text{*} \quad \text{General Formula I}$$

wherein each Ma and Mb is a repeating unit or monomer. The polymeric compound can have only one type of repeating unit as well as two or more types of different repeating units. When a polymeric compound has only one type of repeating unit, it can be referred to as a homopolymer. When a polymeric compound has two or more types of different repeating units, the term "copolymer" or "copolymeric compound" can be used instead. For example, a copolymeric compound can include repeating units where Ma and Mb represent two different repeating units. Unless specified otherwise, the assembly of the repeating units in the copolymer can be head-to-tail, head-to-head, or tail-to-tail. In addition, unless specified otherwise, the copolymer can be a random copolymer, an alternating copolymer, or a block copolymer. For example, General Formula I can be used to represent a copolymer of Ma and Mb having x mole fraction of Ma and y mole fraction of Mb in the copolymer, where the manner in which comonomers Ma and Mb is repeated can be alternating, random, regiorandom, regioregular, or in blocks, with up to z comonomers present. In addition to its composition, a polymeric compound can be further characterized by its degree of polymerization (n) and molar mass (e.g., number average molecular weight (M) and/or weight average molecular weight (Mw) depending on the measuring technique(s)). The polymers described herein can exist in numerous stereochemical configurations, such as isotactic, syndiotactic, atactic, or a combination thereof.

Provided herein is a functional masterbatch that when combined with a base polymer can impart bacteria repellant properties to the surface of the resulting bacteria repellant polymer composite. In certain embodiments, the masterbatch comprises a grafted silicone polyether and a porous inorganic nanoparticle.

In certain embodiments, the grafted silicone polyether is a polymer comprising a repeating unit of Formula 1:

wherein $R^1$ for each instance is independently $C_1$-$C_6$ alkyl or a polyether moiety represented by the formula: —$(CH_2)_m R^2$, wherein m is a whole number selected from m 0-4; and $R^2$ is a polyether; and the grafted silicone polyether is terminated with one or more moieties selected from $C_1$-$C_6$ alkyl, hydroxyl, $C_1$-$C_6$ alkoxyl, or the polyether. In certain embodiments, the grafted silicone polyether comprising a repeating unit of Formula 1 comprises 1, 2, 3, 4, 5, 6, 7, 8, 9, 10, or more polyether moieties.

The grafted silicone polyether can be a block, alternating, random, regiorandom, or regioregular polymer. The grafted silicone polyether can be an isotactic polymer, syndiotactic polymer, atactic polymer, or a combination thereof.

In certain embodiments, m is 0, 2-4 or 2-3. In instances in which m is 0, the polyether can be covalently to the silicon group of the repeating unit of Formula 1 via a silicon-oxygen covalent bond.

In instances in which $R^1$ is a $C_1$-$C_6$ alkyl, $R^1$ can be a liner or branched chain $C_1$-$C_5$ alkyl, $C_1$-$C_4$ alkyl, $C_1$-$C_3$ alkyl, $C_1$-$C_2$ alkyl. In certain embodiments, in instances in which $R^1$ is a $R^1$ is methyl.

In certain embodiments, the polyether is selected from the group consisting of is selected from the group consisting of a fatty alcohol polyoxyalkylene ether, a polyoxyalkylene fatty acid, a polyoxyalkylene sorbitan, a polyoxyalkylene sorbitan fatty acid ester, a polyalkylene glycol, and combinations thereof.

In certain embodiments, the polyether is selected from the group consisting of polyoxyethylene glycol, polyoxyethylene sorbitol hexaoleate, polyoxyethylene sorbitan monolaurate, polyoxyethylene lauryl ether, polyoxyethylene hydrogenated castor oil, polyoxyethylene cetyl/octadecyl ether, polyoxyethylene acrylate, silane terminated polyoxyethylene, polyoxyethylene vinyl ether, polyoxythylene grafted polymethylsiloxane polyoxypropylene glycol, polyoxypropylene amine, polyoxypropylene acrylate, polyoxypropylene methacrylate, polyoxypropylene glyceryl ether, and combinations thereof. In certain embodiments, the polyether is selected from the group consisting of polyoxyethylene glycol, ceteareth-20, poly(ethylene glycol) sorbitol hexaoleate, polysorbate 80, PEG-40 hydrogenated castor oil, and combinations thereof. In certain embodiments, the polyether is polyoxyethylene glycol.

The polyether moiety may have a number average molecular weight between 300-50,000 Da.

The grafted silicone polyether may have a number average molecular weight between 500-1,000,000 Da, 500-900,000 Da, 500-800,000 Da, 500-700,000 Da, 500-600,000 Da, 500-500,000 Da, 500-400,000 Da, 500-300,000 Da, 500-200,000 Da, 500-100,000 Da, 500-100,000 Da, 500-90,000 Da 500-90,000 Da, 500-80,000 Da, 500-70,000 Da, 500-60,000 Da, 300-50,000 Da, 500-40,000 Da, 500-30,000 Da, 10,000-30,000 Da, 500-20,000 10,000-20,000 Da, Da, 500-10,000 Da, or 1,000-10,000 Da.

In certain embodiments, the polyether moiety is represented by the formula: —$(CH_2)_m R^2$, wherein m is 2 or 3; and $R^2$ is polyoxyethylene glycol.

In certain embodiments, the grafted silicone polyether has Formula 2:

2 wherein n is a whole number between 1-100,000; 1,000-100,000; 10,000-100,000; 1-10,000; 1-1,000; 100-1,000, or 1-100; $R^1$ for each instance is independently $C_1$-$C_6$ alkyl, methyl or a polyether moiety represented by the formula: —$(CH_2)_m R^2$, wherein m is a whole number selected from m 0-4; and $R^3$ for each instance is independently hydroxyl, methoxyl, $C_1$-$C_6$ alkyloxyl, $C_1$-$C_6$ alkyl, methyl or a polyether moiety represented by the formula: —$(CH_2)_m R^2$, wherein the grafted silicone polyether comprises at least one polyether moiety. In certain embodiments, the grafted silicone polyether comprising a repeating unit of Formula 2 comprises 1, 2, 3, 4, 5, 6, 7, 8, 9, 10, or more polyether moieties.

In certain embodiments, the grafted silicone polyether is a polymer comprising a repeating unit of Formula 3:

3 wherein n is a whole number between 1-100,000; 1,000-100,000; 10,000-100,000; 1-10,000; and $R^3$ for each instance is independently hydroxyl, methoxyl, or a polyether moiety represented by the formula: —$(CH_2)_m R^2$, wherein m is a whole number selected from m 0-4, and wherein at least one $R^2$ is a polyether moiety.

The porous inorganic nanoparticle may be selected from silica, aluminum oxide, carbon black, zinc oxide, titanium oxide, zirconium oxide, ferrous oxide, and mixtures thereof. In certain embodiments, the porous inorganic nanoparticle is in the nanometer size range, e.g., are in the range of from about 1 nm up to about 900 nm; about 1 nm up to about 500 nm; about 1 nm up to about 100 nm; about 5 nm up to about 100 nm; or about 5 nm up to about 50 nm. In certain embodiments, the porous inorganic nanoparticle has a specific surface area between about 50-500 m²/g, about 100-500 m²/g, about 200-500 m²/g, about 300-500 m²/g, or about 400-500 m²/g.

Also provided herein is a bacteria repellant polymer composite comprising the masterbatch and at least one base polymer.

In certain embodiments, the at least one base polymer is selected from the group consisting of thermoplastic polyurethane (TPU), styrene-ethylene-butylene-styrene (SEBS), polyolefin elastomers (POE), thermoplastic polyester elastomer (TPEE), thermoplastic vulcanizates (TPV), polyethene (PE), polypropylene (PP), polystyrene (PS), styrene acrylonitrile resin (SAN), acrylonitrile butadiene styrene (ABS), polycyclohexylenedimethylene terephthalate glycol (PCTG), polylactic acid (PLA), poly(methyl methacrylate) (PMMA), polyethylene terephthalate (PET), polycarbonate (PC), polymethylpentene (PMP), polyamide (PA), polyvinyl chloride (PVC), ethylene-vinyl acetate (EVA), methylmethacrylate butadiene styrene (MBS), a silicone rubber, and blends and copolymers thereof.

In certain embodiments, the at least one base polymer is a silicone rubber. In certain embodiments, the silicone rubber is a liquid silicone rubber, heat curing silicone rubber, room temperature vulcanizing silicone rubber. In certain embodiments, the silicone rubber is a crosslinked silicone rubber.

The masterbatch and bacteria repellant polymer composite may further comprise at least one additive selected from antioxidants, brighteners, nucleating agents, mold release agents, color stabilizers, UV stabilizers, fillers, plasticizers, impact modifiers, colorants, lubricants, antistatic agents, fire retardants, and anti-ester exchange agents with the masterbatch and/or the bacteria repellant polymer composite.

The bacteria repellant polymer composite can comprise between about 0.1-10%, about 0.1-9%, about 0.1-8%, about 0.1-7%, about 0.1-6%, about 0.1-5%, about 1-5%, about 2-5%, about 2-4%, about 3-4%, about 3.5-4%, or about 3.7-4% by weight of the grafted silicone polyether relative to the weight of the grafted silicone polyether, porous inorganic nanoparticle, and base polymer.

The bacteria repellant polymer composite can comprise between about 0.01-5%, about 0.01-4%, about 0.01-3%, about 0.01-2%, about 0.01-1%, about 0.1-1%, about 0.2-1%, about 0.3-1%, about 0.4-1%, about 0.4-0.9%, about 0.4-0.8%, about 0.5-0.8%, about 0.6-0.8%, or about 0.7-0.8% by weight of the porous inorganic nanoparticle relative to the weight of the grafted silicone polyether, porous inorganic nanoparticle, and base polymer.

The bacteria repellant polymer composite can comprise between 50-98%, about 60-98%, about 70-98%, about 70-98%, about 80-98%, about 90-98%, about 91-98%, about 93-98%, about 94-98%, about 95-98%, about 95-97% by weight of the base polymer relative to the weight of the grafted silicone polyether, porous inorganic nanoparticle, and base polymer.

The bacteria repellant polymer composite can comprise between about 1-10%, about 1-9%, about 1-8%, about 1-7%, about 1-6%, or about 1-5% by weight of the of the at least one additive to the weight of the grafted silicone polyether, porous inorganic nanoparticle, base polymer, and of the at least one additive.

Also provided is a method for preparing a bacteria repellant polymer composite, the method comprising: combining the grafted silicone polyether and the porous inorganic nanoparticle thereby forming the masterbatch; combining the masterbatch with the at least one base polymer thereby forming an uncured polymer composite; and curing the uncured polymer composite thereby forming the bacteria repellant polymer composite.

The grafted silicone polyether may be combined with the porous inorganic nanoparticle and the base polymer at about 0.1-10%, about 0.1-9%, about 0.1-8%, about 0.1-7%, about 0.1-6%, about 0.1-5%, about 1-5%, about 2-5%, about 2-4%, about 3-4%, about 3.5-4%, or about 3.7-4% by weight relative to the weight of the grafted silicone polyether, porous inorganic nanoparticle, and base polymer.

The porous inorganic nanoparticle can be combined with the grafted silicone polyether, and base polymer at about 0.01-5%, about 0.01-4%, about 0.01-3%, about 0.01-2%, about 0.01-1%, about 0.1-1%, about 0.2-1%, about 0.3-1%, about 0.4-1%, about 0.4-0.9%, about 0.4-0.8%, about 0.5-0.8%, about 0.6-0.8%, or about 0.7-0.8% by weight relative to the weight of the grafted silicone polyether, porous inorganic nanoparticle, and base polymer.

The base polymer can be combined with the grafted silicone polyether and the porous inorganic nanoparticle at about 50-98%, about 60-98%, about 70-98%, about 70-98%, about 80-98%, about 90-98%, about 91-98%, about 93-98%, about 94-98%, about 95-98%, about 95-97%, by weight of the base polymer relative to the weight of the grafted silicone polyether, porous inorganic nanoparticle, and base polymer.

The step of curing the uncured polymer composite can comprise heating the uncured polymer composite at a temperature of 120° C.-220° C., 120° C.-210° C., 120° C.-200° C., 120° C.-200° C., 130° C.-200° C., or 140° C.-200° C. The step of curing the uncured polymer composite can comprise heating the uncured polymer composite for between 60 to 600 seconds, 100 to 600 seconds, 150 to 600 seconds, 150 to 550 seconds, 150 to 500 seconds, or 180 to 550 seconds, In certain embodiments, the step of curing the uncured polymer composite can comprise heating the uncured polymer composite at a temperature of 120° C.-200° C., 120° C.-190° C., 130° C.-190° C., or 130° C.-180° C.; and then post curing the polymer composite at a temperature between 180° C.-220° C., 180° C.-210° C., 190° C.-210° C., 195° C.-205° C., or 200° C.

The step of curing the uncured polymer composite can comprise heating the uncured polymer composite for between 60 to 600 seconds, 100 to 600 seconds, 150 to 600 seconds, 150 to 550 seconds, 150 to 500 seconds, or 180 to 550 seconds. The step of post-curing the polymer composite can comprise heating the uncured polymer composite for between 1 to 6 hours, 1 to 5 hours, 2 to 5 hours, or 2 to 4 hours.

In certain embodiments, the method for preparing the bacteria repellant polymer composite further comprises combining a crosslinking agent with the masterbatch and the at least one base polymer thereby forming an uncured polymer composite comprising the crosslinking agent; and curing the uncured polymer composite thereby forming a crosslinked bacteria repellant polymer composite.

Any crosslinking agent known in the art may be used in the methods described herein. In certain embodiments, the crosslinking agent is an organic peroxide, such as a dialkyl peroxide, or diaryl peroxide, or a hydrosilation catalyst, such as a platinum catalyst or rhodium catalyst. In certain embodiments, the crosslinking agent is bis-(2,4-dichlorobenzoyl)-peroxide, dicumylperoxide, or a combination thereof. In certain embodiments, the crosslinking agent is Karstedt's catalyst or Cp*Ru(MeCN)$_3$]PF$_6$.

In an alternative embodiment, the bacteria repellant polymer may be prepared combining a functionalized polyether selected from a dialkyl hydrosilane terminated polyether, an allyl terminated polyether, and vinyl terminated polyether; at least one silicone rubber base polymer; and a porous inorganic nanoparticle thereby forming an uncured polymer composite; and curing the uncured polymer composite, which results in the grafting of the functionalized polyether to at least a portion of the at least one silicone rubber base polymer and thereby forming the bacteria repellant polymer composite.

In certain embodiments, the at least one silicone rubber base polymer is a liquid silicone rubber, heat curing silicone rubber, room temperature vulcanizing silicone rubber.

In instances in which the functionalized polyether is a dialkyl hydrosilane terminated polyether, the at least one silicone rubber base polymer may comprise complimentary reactive functionality, such as an olefin, which is capable of reacting with the dialkyl hydrosilane terminated polyether in the presence of a crosslinking agent. Accordingly, in certain embodiments, the at least one silicone rubber base polymer comprises one or more olefin moieties, such as a vinyl silane, an allyl silane, or an allyloxyl silane.

In certain embodiments, the functionalized polyether has Formula 4:

wherein n is a whole number between 1-100,000; 1,000-100,000; 10,000-100,000; 1-10,000; 1-1,000; 100-1,000, or 1-100; $R^1$ for each instance is independently methyl, vinyl, or allyl; and $R^3$ for each instance is independently hydroxyl, methoxyl, methyl, vinyl, or allyl, wherein the grafted silicone polyether comprises at least one polyether moiety. In certain embodiments, functionalized polyether of Formula 4 comprises 1, 2, 3, 4, 5, 6, 7, 8, 9, 10, or more vinyl and/or allyl moieties.

In instances in which the functionalized polyether is an allyl terminated polyether, the at least one silicone rubber base polymer may comprise complimentary reactive functionality, such as a dialkyl hydrosilane, which is capable of reacting with the dialkyl hydrosilane terminated polyether in the presence of a crosslinking agent. Accordingly, in certain embodiments, the at least one silicone rubber base polymer comprises one or more hydrosilane moieties, such as a dialkylhydrosilane or dimethylhydrosilane.

In certain embodiments, the functionalized polyether has Formula 5:

wherein n is a whole number between 1-100,000; 1,000-100,000; 10,000-100,000; 1-10,000; 1-1,000; 100-1,000, or 1-100; $R^1$ for each instance is independently $C_1$-$C_6$ alkyl, methyl or hydrogen; and $R^3$ for each instance is independently hydroxyl, $C_1$-$C_6$ alkyloxyl, methoxyl, or hydrogen, wherein the grafted silicone polyether comprises at least one polyether moiety. In certain embodiments, functionalized polyether of Formula 5 comprises 1, 2, 3, 4, 5, 6, 7, 8, 9, 10, or more hydrogen moieties.

In certain embodiments, a sub-stoichiometric amount of the functionalized polyether is added to the at least one silicone base polymer such that only a portion of the at least one silicone base polymer is grafted to the functionalized polyether. In certain embodiments, the functionalized polyether is combined with the at least one silicone base polymer at a weight percentage between about 1-15%, about 1-14%, about 1-13%, about 1-12%, about 1-11%, about 1-10%, about 1-9%, about 1-8%, about 1-7%, about 2-7%, about 3-7%, about 3-6%, or about 3-5%, or about 4%.

The porous inorganic nanoparticle can be combined with the functionalized polyether, and base polymer at about 0.01-5%, about 0.01-4%, about 0.01-3%, about 0.01-2%, about 0.01-1%, about 0.1-1%, about 0.2-1%, about 0.3-1%, about 0.4-1%, about 0.4-0.9%, about 0.4-0.8%, about 0.5-0.8%, about 0.6-0.8%, or about 0.7-0.8% by weight relative to the weight of the functionalized polyether, porous inorganic nanoparticle, and at least one silicone base polymer.

The step of curing the uncured polymer composite can comprise heating the uncured polymer composite at a temperature of 120° C.-220° C., 120° C.-210° C., 120° C.-200° C., 120° C.-200° C., 130° C.-200° C., or 140° C.-200° C. The step of curing the uncured polymer composite can comprise heating the uncured polymer composite for between 60 to 600 seconds, 100 to 600 seconds, 150 to 600 seconds, 150 to 550 seconds, 150 to 500 seconds, or 180 to 550 seconds, In certain embodiments, the step of curing the uncured polymer composite can comprise heating the uncured polymer composite at a temperature of 120° C.-200° C., 120° C.-190° C., 130° C.-190° C., or 130° C.-180° C.; and then post curing the polymer composite at a temperature between 180° C.-220° C., 180° C.-210° C., 190° C.-210° C., 195° C.-205° C., or 200° C.

The step of curing the uncured polymer composite can comprise heating the uncured polymer composite for between 60 to 600 seconds, 100 to 600 seconds, 150 to 600 seconds, 150 to 550 seconds, 150 to 500 seconds, or 180 to 550 seconds. The step of post-curing the polymer composite can comprise heating the uncured polymer composite for between 1 to 6 hours, 1 to 5 hours, 2 to 5 hours, or 2 to 4 hours.

The masterbatch and bacteria repellant polymer composite can be prepared by blending or mixing the essential ingredients, and other optional components, as uniformly as possible employing any conventional blending means. Mixing can be performed in any way known to the person skilled in the art. Commonly used mixing devices are a tumbler mixer, a high-speed mixer; blenders, for example V blender, ribbon blender or a cone blender; mixers, for example a jet mixer, a planetary mixer or a Banbury mixer. During mixing the mixture can be preheated. Mixing can also be performed in a part of an extruder The bacteria repellant polymer composite can be molded into a shape such as a pellet, but also semi-finished product or an article. Suitable examples of processes in which the bacteria repellant polymer composite is formed into a shape include blow molding, injection molding, compression molding, thermoforming, film blowing, casting and extrusion compression molding. Film blowing is widely used to produce films. Injection molding and blow molding are widely used to produce articles such as, bottles, boxes and containers. Extrusion is widely used to produce articles for example rods, sheets and pipes.

The bacteria repellant polymer composite described herein can be used in the preparation of plastic articles with germ-repellant function. The invention is also directed to the use of the bacteria repellant polymer composite for the preparation of an article. The article can be an article for the storage or transport of food or beverages.

In certain embodiments, the article is a pipe for the transport of a fluid. The fluid can be a beverage, for example water and for example a soft drink, wine, beer or milk.

In certain embodiments, the article is a flexible packaging. Suitable examples are films, sheets, plastic bags, containers, bottles, boxes and buckets. In certain embodiments, the bacteria repellant polymer composite is used for pharmaceutical packaging, such as for example in primary packaging that is in direct contact with the active pharmaceutical ingredient and includes blister packs, fluid bags, pouches, bottles, vials and ampoules.

In certain embodiments, the article is used in medical applications. Medical applications include for example closures, rigid bottles and ampoules, needle sheaths, plunger rods for single-use syringes, moldings to house diagnostic equipment, collapsible tube shoulders, blow-fill-seal products, collapsible tube bodies, film for primary and secondary medical and pharmaceutical packaging, disposable syringes, actuator bodies, specimen cups, moldings to house diagnostic equipment, centrifuge tubes, multi-well micro-titration plates, trays, pipettes and caps and closures.

The embodiments of the present disclosure can be better understood with reference to the examples provided below. The invention is not limited to the examples given here.

Example 1

This example describes the modification method for heat curing rubber (HCR).

8 g (4% wt) of monovinyl terminated polyethylene glycol (number averaged molecular weight 600 Da) was mixed with 1.5 g nano silica. The resulting mixture was then mixed with 192 g (96 wt %) of silicone rubber (sold under the tradename ELASTOSIL® R401-60 by Wacker™) and Karstedt's catalyst in Banbury mixer (processing temperature 25° C.-30° C.) for 1 hour. The resulting mixture was then cured through compression molding (165° C., 3 mins), and then post-cure under 200° C. for 4 hours to obtain the bacteria repellant polymer composite.

Taking unprocessed HCR as control, germ repellant test was performed on modified HCR. Germ repellency was tested against *E. coli.* (Gram negative) and *Staphylococcus aureus* (Gram positive). Compare to control sample, bacteria retained on modified HCR sample has 99% reduction after 24 hours incubation.

By performing contact angle goniometry to compare the hydrophilicity of material, unmodified HCR has a contact angle between 100-1100, while modified HCR has a contact angle between 80-90°.

To investigate the change in mechanical properties, a series of tests were performed according to ASTM standards to testify modified and unmodified HCR. Results are listed in Table 1. There is about 20% difference between modified and unmodified HCR, showing that the modification did not substantially effect the mechanical properties of the material.

TABLE 1

|  | Shore A Hardness | Tensile strength | Elongation to break | Tearing strength |
|---|---|---|---|---|
| Standard | ASTM D2240 | ASTM D412 | ASTM D412 | ASTM D624 |
| Unmodified HCR (Wacker R401-60) | 61A | 11 N/mm$^2$ | 440% | 24 N/mm |
| Modified HCR | 56A | 8 N/mm$^2$ | 403% | 21 N/mm |

Example 2

This example describes the modification method for heat curing rubber (HCR).

8 g (4% wt) of monosilicate terminated polyethylene glycol (number averaged molecular weight 1,000 Da) is mixed with 1.5 g nano silica. Such mixture is then mixed with 192 g (96 wt %) of silicone rubber (sold under the tradename ELASTOSIL® R401-40A by Wacker™) and Karstedt's catalyst in Banbury mixer (processing temperature 25° C.-30° C.) for 1 hour. This mixture is cured through compression molding (165° C., 3 mins), and then post-cure under 200° C. for 4 hours to obtain polymer product.

Taking unprocessed HCR as control, germ repellant test was performed on modified HCR. Germ repellency was tested against *E. coli*. (Gram negative) and *Staphylococcus aureus* (Gram positive). Compare to control sample, bacteria retained on modified HCR sample has 99% reduction after 24 hours incubation.

By performing contact angle goniometry to compare the hydrophilicity of material, unmodified HCR has a contact angle between 100-1100, while modified HCR has a contact angle between 80-90°.

To investigate the change in mechanical properties, a series of tests were performed according to ASTM standards to testify modified and unmodified HCR. Results are listed in Table 2. There is about 20% difference between modified and unmodified HCR, showing that the modification did not substantially effect the mechanical properties of the material.

TABLE 2

|  | Shore A Hardness | Tensile strength | Elongation to break | Tearing strength |
| --- | --- | --- | --- | --- |
| Standard | ASTM D2240 | ASTM D412 | ASTM D412 | ASTM D624 |
| Unmodified HCR (Wacker R401-60) | 42A | 10 N/mm$^2$ | 580% | 23 N/mm |
| Modified HCR | 39A | 9 N/mm$^2$ | 563% | 20 N/mm |

Example 3

This example describes the modification method for liquid silicone rubber (LSR).

8 g (4% wt) of polyethylene glycol grafted polymethylsiloxane (sold under the tradename XIAMETER™ OFX-0193 by Dow Corning) is mixed with 1.5 g nano silica. Such mixture is then mixed, with portion A, B of liquid silicone rubber (sold under the tradename Elastosil® 3038/30 by Wacker), 100 mL each, in a liquid silicone injection molding machine. Additive is maintained at 4 wt % of mixture. This mixture is cured through injection molding (165° C., 3 mins), and then post-cure under 200° C. for 4 hours to obtain polymer product.

Taking unprocessed LSR as control, germ repellant test was performed on modified LSR. Germ repellency was tested against *E. coli*. (Gram negative) and *Staphylococcus aureus* (Gram positive). Compare to control sample, bacteria retained on modified LSR sample has 99% reduction after 24 hours incubation.

By performing contact angle goniometry to compare the hydrophilicity of material, unmodified LSR has a contact angle between 100-1100, while modified LSR has a contact angle between 80-90°.

To investigate the change in mechanical properties, a series of tests were performed according to ASTM standards to testify modified and unmodified LSR. Results are listed in Table 3. There is about 20% difference between modified and unmodified LSR, showing that the modification did not substantially effect the mechanical properties of the material.

TABLE 3

|  | Shore A Hardness | Tensile strength | Elongation to break | Tearing strength |
| --- | --- | --- | --- | --- |
| Standard | ASTM D2240 | ASTM D412 | ASTM D412 | ASTM D624 |
| Unmodified LSR | 31A | 7.5 N/mm$^2$ | 620% | 23 N/mm |
| Modified LSR | 29A | 6 N/mm$^2$ | 590% | 21 N/mm |

Example 4

This example describes the modification method for liquid silicone rubber (LSR).

8 g (4% wt) of polymethylsiloxane co-grafted with ethylene and polyethylene glycol (custom made, number averaged molecular weight 5,000 Da) is mixed with 1.5 g nano silica. Such mixture is then mixed, with portion A, B of liquid silicone rubber (sold under the tradename ELASTOSIL® 3038/30 by Wacker), 100 mL each, in a liquid silicone injection molding machine. Additive is maintained at 4 wt % of mixture. This mixture is cured through injection molding (165° C., 3 mins), and then post-cure under 200° C. for 4 hours to obtain polymer product.

Taking unprocessed LSR as control, germ repellant test was performed on modified LSR. Germ repellency was tested against *E. coli*. (Gram negative) and *Staphylococcus aureus* (Gram positive). Compare to control sample, bacteria retained on modified LSR sample has 99% reduction after 24 hours incubation.

By performing contact angle goniometry to compare the hydrophilicity of material, unmodified LSR has a contact angle between 100-1100, while modified LSR has a contact angle between 80-90°.

To investigate the change in mechanical properties, a series of tests were performed according to ASTM standards to testify modified and unmodified LSR. Results are listed in Table 4. There is about 20% difference between modified and unmodified LSR, showing that the modification did not substantially effect the mechanical properties of the material.

TABLE 4

| | Shore A Hardness | Tensile strength | Elongation to break | Tearing strength |
|---|---|---|---|---|
| Standard | ASTM D2240 | ASTM D412 | ASTM D412 | ASTM D624 |
| Unmodified LSR | 31A | 7.5 N/mm$^2$ | 620% | 23 N/mm |
| Modified LSR | 29A | 6 N/mm$^2$ | 590% | 21 N/mm |

Example 5

This example describes a comparative unsuccessful modification method for heat curing rubber (HCR).

8 g (4% wt) of monosilicate terminated polyethylene glycol (number averaged molecular weight 1000 Da) was mixed with 192 g (96 wt %) of silicone rubber (Wacker R401-40A) and Karstedt's catalyst in Banbury mixer (processing temperature 25° C.-30° C.) for 1 hour. Further processing failed to proceed as the additive greatly reduces shear force and thus mixing could not be performed.

Example 6

This example describes an unsuccessful modification method for heat curing rubber (HCR).

2 g (1% wt) of monovinyl terminated polyethylene glycol (number averaged molecular weight 600 Da) is mixed with 10 g nano silica. Such mixture is then mixed with 198 g (99 wt %) of silicone rubber (sold under the tradename ELASTOSIL® R401-40A by Wacker) and Karstedt's catalyst in Banbury mixer (processing temperature 25° C.-30° C.) for 1 hour. This mixture is cured through compression molding (165° C., 3 mins), and then post-cure under 200° C. for 4 hours to obtain polymer product.

Taking unprocessed HCR as control, germ repellant test was performed on modified HCR. Germ repellency was tested against *E. coli.* (Gram negative) and *Staphylococcus aureus* (Gram positive). Compare to control sample, bacteria retained on modified HCR sample after 24 hours incubation has 99% reduction against SA but only 14.71% reduction against *E. coli.*

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the described specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A bacteria repellant polymer composite comprising a grafted silicone polyether, a porous inorganic nanoparticle selected from the group consisting of aluminum oxide, carbon black, zinc oxide, ferrous oxide, and mixtures thereof, and at least one base polymer, wherein the porous inorganic nanoparticle is present at a weight ratio of at least 0.5% wt/wt relative to the weight of the grafted silicone polyether, the at least one base polymer, and the porous inorganic nanoparticle, and wherein the at least one base polymer is a silicone rubber.

2. The bacteria repellant polymer composite of claim 1, wherein the grafted silicone polyether comprises one or more polyethers selected from the group consisting of a fatty alcohol polyoxyalkylene ether, a polyoxyalkylene fatty acid, a polyoxyalkylene sorbitan, a polyoxyalkylene sorbitan fatty acid ester, a polyalkylene glycol, and combinations thereof grafted to a poly($C_1$-$C_6$) alkylsiloxane.

3. The bacteria repellant polymer composite of claim 1, wherein the grafted silicone polyether is a polymethylsiloxane grafted to one or more polyethers selected from the group consisting of a polyethylene glycol, a polypropylene glycol, or a copolymer thereof, wherein the one or more polyethers each has a number averaged molecular weight between 300-50,000 Da.

4. The bacteria repellant polymer composite of claim 1, wherein the porous inorganic nanoparticle has a specific surface area between 50-500 m$^2$/g.

5. A method of preparing the bacteria repellant polymer composite of claim 1, the method comprising:
combining the grafted silicone polyether and the porous inorganic nanoparticle thereby forming a masterbatch;
combining the masterbatch with the silicone rubber thereby forming an uncured polymer composite; and
curing the uncured polymer composite thereby forming the bacteria repellant polymer composite.

6. The method of claim 5, wherein the step of curing the uncured polymer composite comprises heating the uncured polymer composite at a temperature of 120° C.-220° C.; or combining a curing agent with the uncured polymer composite and heating the uncured polymer composite at a temperature of 120° C.-220° C.

7. A method of preparing the bacteria repellant polymer composite of claim 1, the method comprising: combining a functionalized polyether selected from a dialkyl hydrosilane terminated polyether, an allyl terminated polyether, and a vinyl terminated polyether; silicone rubber; and a porous inorganic nanoparticle thereby forming an uncured polymer composite; and curing the uncured polymer composite resulting in the grafting of the functionalized polyether to a portion of the silicone rubber resulting in formation of the grafted silicon polyether and thereby forming the bacteria repellant polymer composite.

* * * * *